(12) United States Patent
Leigh et al.

(10) Patent No.: US 10,884,205 B2
(45) Date of Patent: Jan. 5, 2021

(54) MODULAR FACEPLATE OPTICAL CONNECTION

(71) Applicant: HEWLETT PACKARD ENTERPRISE DEVELOPMENT LP, Houston, TX (US)

(72) Inventors: Kevin Leigh, Houston, TX (US); John Norton, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/123,195

(22) Filed: Sep. 6, 2018

(65) Prior Publication Data
US 2020/0081208 A1  Mar. 12, 2020

(51) Int. Cl.
G02B 6/42 (2006.01)
H04B 10/40 (2013.01)

(52) U.S. Cl.
CPC .......... *G02B 6/4292* (2013.01); *G02B 6/428* (2013.01); *G02B 6/4277* (2013.01); *G02B 6/4284* (2013.01); *H04B 10/40* (2013.01)

(58) Field of Classification Search
CPC .................................. G02B 6/428; G02B 6/46
See application file for complete search history.

(56) References Cited

U.S. PATENT DOCUMENTS

| | | | |
|---|---|---|---|
| 5,993,251 A | 11/1999 | Brown et al. | |
| 7,234,880 B1* | 6/2007 | Charny | G02B 6/4201 385/92 |
| 7,918,611 B2 | 4/2011 | Hudgins et al. | |
| 8,300,417 B2* | 10/2012 | Leibowitz | G06F 1/185 361/748 |
| 8,750,710 B1* | 6/2014 | Hirt | H04B 10/25759 398/135 |
| 2005/0271391 A1 | 12/2005 | Togami et al. | |
| 2007/0140626 A1 | 6/2007 | Chan | |
| 2007/0258715 A1 | 11/2007 | Androni et al. | |
| 2009/0279889 A1 | 11/2009 | Kirkpatrick et al. | |

(Continued)

FOREIGN PATENT DOCUMENTS

| | | |
|---|---|---|
| CN | 207780553 | 8/2018 |
| WO | WO2017019083 | 2/2017 |

OTHER PUBLICATIONS

"PCIe X4 Gigabit Fiber Card Single Mode 1310nm 10km LC Optical Transceiver Module", Accessed on Sep. 24, 2018, 30 pages.
Samteo, "Pcie®-Over-Fiber Adaptor Card", Apr. 2018, 2 pages.

*Primary Examiner* — Eric Wong
(74) *Attorney, Agent, or Firm* — Nolte Intellectual Property Law Group

(57) ABSTRACT

An optical conversion module having a printed circuit board having a proximate and a distal end and including an electrical interface at the distal end. The optical conversion module also having a faceplate modularly connected to the proximate end of the printed circuit board, the faceplate having at least one retention device. The optical conversion module further having an optical transceiver disposed on and electrically connected to the printed circuit board, a chip optical connector disposed on and optically connected to the optical transceiver, and a faceplate optical connector modularly disposed through the faceplate and modularly connected to the chip optical connector through an optical fiber jumper.

14 Claims, 15 Drawing Sheets

(56) References Cited

U.S. PATENT DOCUMENTS

| | | | |
|---|---|---|---|
| 2010/0246118 A1* | 9/2010 | Attlesey | G06F 1/20 |
| | | | 361/679.53 |
| 2014/0147085 A1* | 5/2014 | Lim | G02B 6/4249 |
| | | | 385/89 |
| 2016/0380698 A1 | 12/2016 | Elahmadi et al. | |
| 2019/0113955 A1* | 4/2019 | Leigh | G02B 6/428 |

* cited by examiner

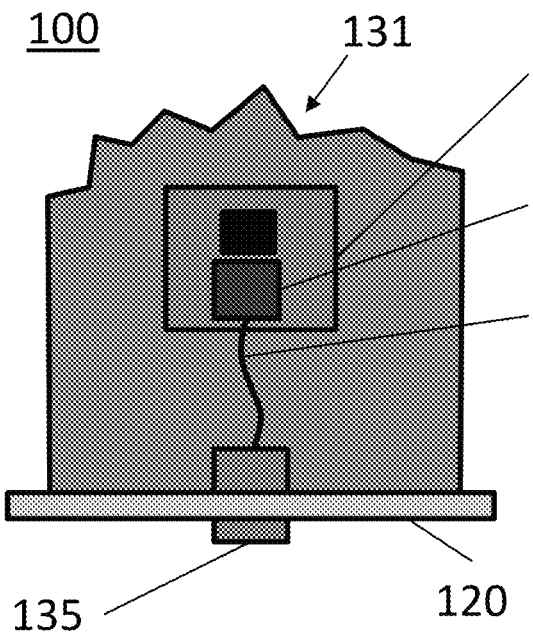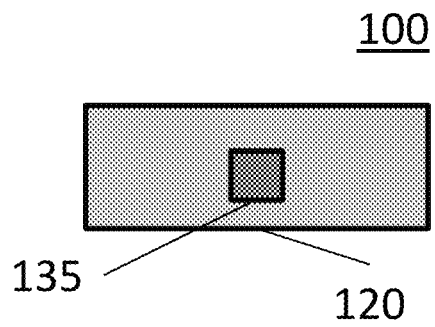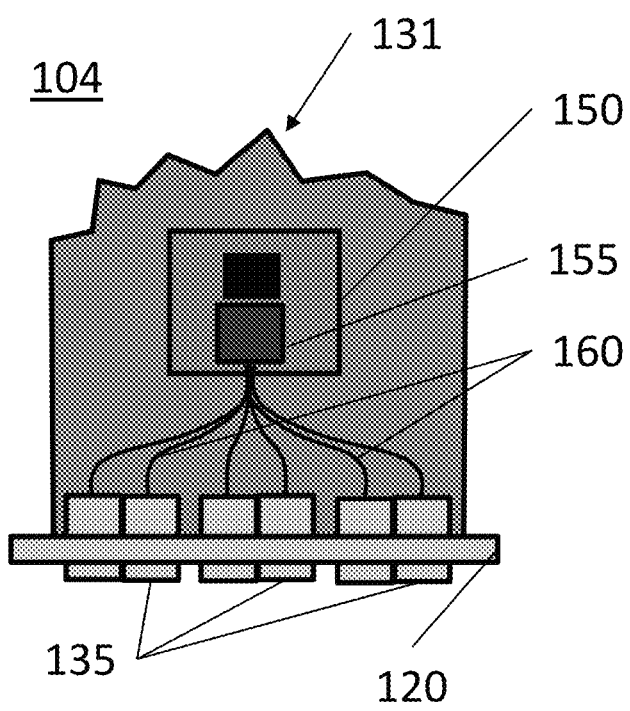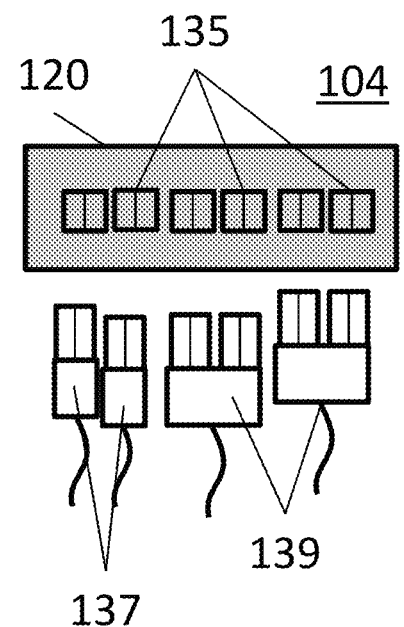
FIG. 6
FIG. 7
FIG. 8
FIG. 9

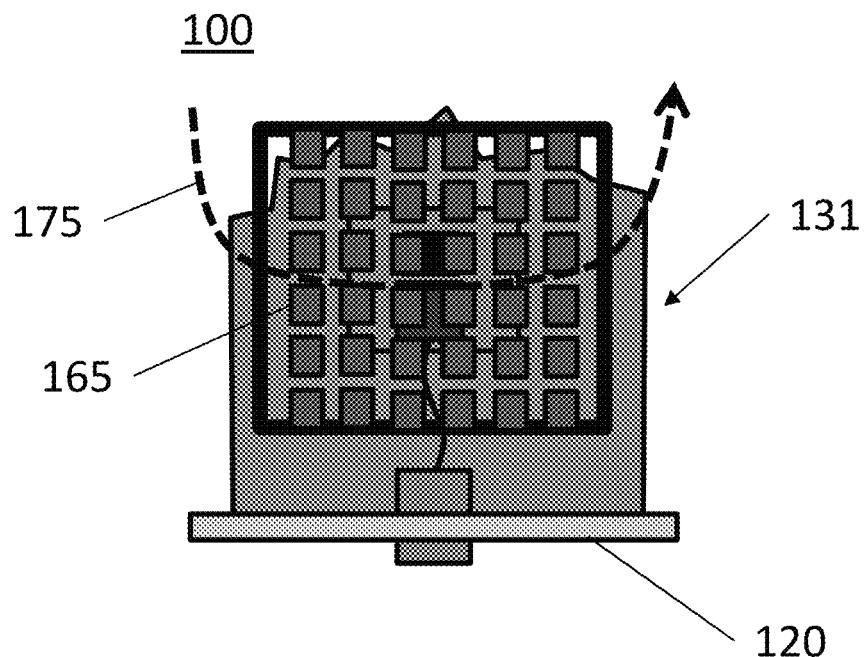
FIG. 14
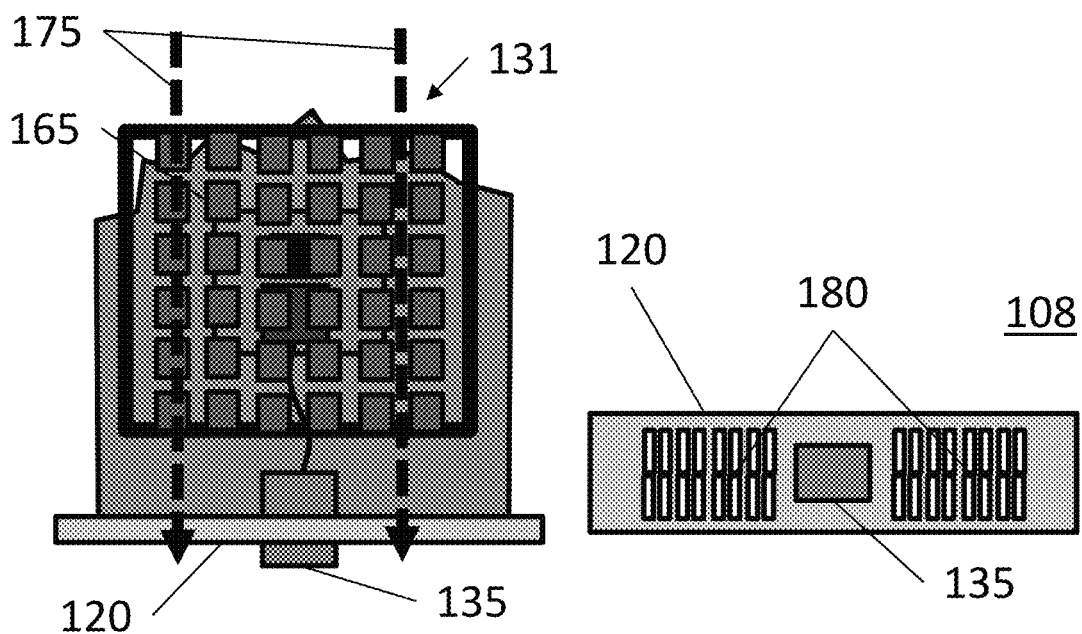
FIG. 15
FIG. 16

MODULAR FACEPLATE OPTICAL CONNECTION

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output, and for some applications, optical fibers may be coupled to other optical fibers and/or system components by an optical connector.

BRIEF DESCRIPTION OF THE DRAWINGS

FIG. 6 is a top view of the optical conversion module of FIGS. 1 and 2 in accordance with one or more example embodiments.

FIG. 7 is an end view of the optical conversion module of FIGS. 1, 2, and 6 in accordance with one or more example embodiments.

FIG. 8 is a top view of an optical conversion module in accordance with one or more example embodiments.

FIG. 9 is an end view of the optical conversion module of FIG. 8 in accordance with one or more example embodiments.

FIG. 14 is a top view of an optical conversion module in accordance with one or more example embodiments.

FIG. 15 is a top view of an optical conversion module in accordance with one or more example embodiments.

FIG. 16 is an end view of the optical conversion module of FIG. 15 in accordance with one or more example embodiments.

DETAILED DESCRIPTION

Figure 1:
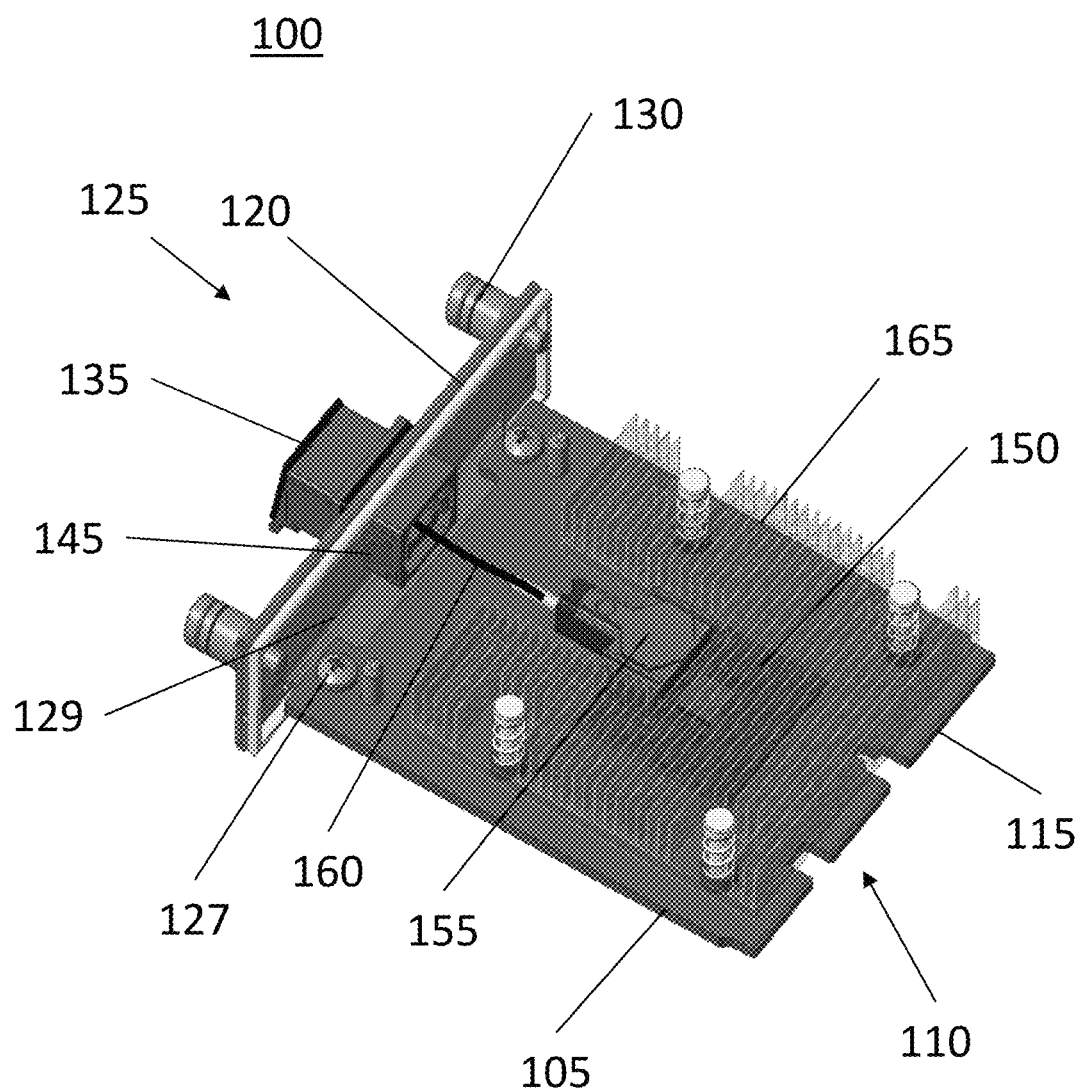
FIG. 1 is a top perspective view of an optical conversion module in accordance with one or more example embodiments.

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

Optical cables are frequently used to transmit data between computing systems. The optical cables are connected to optical connectors that are installed on computing systems. Upon receipt of data from an optical cable through the optical connector, the data is transmitted through the printed circuit board of the system board to a system processor on the printed circuit board. To transmit data through the system board, the system board has electrically conductive traces embedded therein, which connect various components of the system board, including the system processor.

Due to the materials used in printed circuit boards, such as commonly used FR4 (woven glass and epoxy), solder mask, and the inclusion of through-hole vias for multiple layers of electrically conductive traces, signal strength decreases as high-speed signals are sent along the electrically conductive traces. The loss of signal power as components are added to a circuit and electrically conductive traces are lengthened is referred to as "insertion loss". Signal frequency is another factor in insertion loss. As frequency increases, insertion losses increase and signal integrity is negatively impacted, thereby making longer electrically conductive trace lengths in certain components impracticable. As computing systems and components evolve, higher speed transmission of data is required. The greater number of components and longer electrically conductive traces results in greater insertion loss, which negatively impacts performance or inhibits the use of certain high-speed components.

In order to decrease insertion loss, the length of the electrically conductive traces may be decreased. To decrease the length of the electrically conductive traces, optical transceivers may be located more closely to the processing aspects of the system board. Optical connectors discussed herein may move an optical connection longitudinally deeper within a computing system, thereby decreasing the length of the electrically conductive traces and decreasing the potential for insertion loss.

Optical conversion module discussed herein may further provide adaptable, modular faceplate features, allowing the optical connectors to be modified to meet operational requirements. For example, the number, orientation, type, and configuration of optical connectors may be modified to match the requirements of emerging technology, or to meet the requirements of specific implementations. The modularity of the faceplate may also allow a faceplate to be swapped, as well as allow other components to be modularly adapted as computing system requirements change.

Additionally, the modularity of the optical conversion module discussed herein may allow components to be hot-swappable, thereby allowing replacing or adding components without stopping or shutting down the computing system. Because computing systems often have numerous optical connections, if one optical connection is taken out of service for replacement or repair, the result may be many other optical connections may also stop functioning. The loss of function of multiple optical connections to replace or repair one optical connection may result in loss of productivity and increased cost.

Turning to FIG. 1, a top perspective view of an optical conversion module according to an example embodiment is shown. Optical conversion module 100 includes a printed circuit board 105. The printed circuit board 105 is used to mechanically support and electrically connect various components through electrically conductive traces (not shown). At a distal end 110, printed circuit board 105 includes an electrical interface 115. In the illustrated example, the electrical interface 115 is an edge contact connector, however, electrical interface 115 may also include beam contact type connectors. The electrical interface 115 is used to connect optical conversion module 100 to a system board (not shown) of a first device, e.g., a computing system (not shown). The connector of the system board where the electrical interface 115 couple to will be shown and described in detail below.

Optical conversion module 100 also includes a faceplate 120 modularly connected to a proximate end 125 of printed circuit board 105. "Modularly connected" in this context means that the faceplate 120 may be removed and interchanged with other faceplates 120 having different sizes, orientations, and optical connectivity, among other considerations. The faceplate 120 may be modularly attached to the printed circuit board 105 by means of securing fasteners 127 on a faceplate fastening feature 129. The modularity of faceplate 120 allows faceplate 120 to be removed from printed circuit board 105 and exchanged with a different faceplate 120 based on the requirements of optical conversion module 100. The removability and interchangeability of faceplates 120 having different sizes, number, orientations, and optical connectivity will be shown and discussed in detail below. The faceplate 120 may be modularly attached to printed circuit board 105 with securing fasteners 127 on faceplate fastening feature 129. The modular attachment of faceplate 120 to printed circuit board 105 may occur during manufacturing to produce different configurations of optical conversion modules 100 using different faceplate 120 types. Fasteners 127 may be a removable type, such as screws, latches, clasps, and the like. In certain configurations fasteners 127 may be permanent, such as rivets.

Faceplate 120 has one or more retention devices 130 that may be used to secure faceplate 120 to a chassis (not shown) or other outer surface of a computing system (not shown). Examples of retention devices 130 may include, for example, bolts, screws, clips, and/or any other devices that may be used to releasably secure faceplate 120 to another surface.

Optical conversion module 100 also includes a faceplate optical connector 135 that is modularly disposed through faceplate 120. Faceplate optical connector 135 may include a ferrule where optical fibers are coupled to and a housing to securely hold a ferrule by means of ferrule retention feature. A ferrule may be modularly installed within a housing. However, unless explicitly described, the term "faceplate optical connector" will be used as an inclusive term hereafter representing both the connector housing and the ferrule. Faceplate optical connector 135 provides optical connectivity between an external optical cable (not shown) and optical conversion module 100. An external optical cable may be plugged into the proximate end 125 of faceplate optical connector 135, thereby allowing a signal to be sent from a second device (not shown), such as a computing system, to the optical conversion module 100 that is installed in the first device. The signal may then be sent from optical conversion module 100 to the computing system (not shown) into which optical conversion module 100 is installed.

Faceplate optical connector 135 is modularly installed, and as such, may be removed and replaced with different faceplate optical connectors 135 based on, for example, the type of optical cables in use. In this context, "modularly disposed" or modularly installed" means that the faceplate optical connector 135 may be removed to accommodate replacement, relocation, or some other purpose. A faceplate optical connector 135 may be retained on a faceplate 120 by means of connector retention devices such as clips on the inner portion 145 of the connector, or screws on the outer portion 140 of the connector. Removal of faceplate optical connector 135 may include disconnecting the connector retention device and displacing the optical connector 135 from the void of the faceplate 120.

Optical conversion module 100 may also include an optical transceiver 150 that is disposed on and electrically connected to printed circuit board 105. The optical transceiver 150 is an integrated circuit that is configured to receive external data from external optical cable and transmit the data to other system components by transferring the data through connections on printed circuit board 105. A chip optical connector 155 is disposed on and connected to optical transceiver 150. Chip optical connector 155 is optically connected to faceplate optical connector 135 through an optical fiber jumper 160. Optical fiber jumper 160 may include multiple optical fibers wrapped within a protection sleeve jacket. Optical fiber jumper 160 allows data to be sent from faceplate optical connector 135 to chip optical connector 155 and then to optical transceiver 150. The length and orientation of optical fiber jumper 160 may vary based on the size and orientation of optical conversion module 100, as well as the computing system (not shown) in which optical conversion module 100 is installed.

During operation of optical conversion module 100, requirements specific to the computing environment may change. For example, the type of optical fiber being used may change, thereby requiring the modification of one or more components of optical conversion module 100. While specific implementations will be discussed in detail below, generally, the modularity of faceplate 120, faceplate optical connector 135, and the ability to adapt optical fiber jumper 160 to changing requirements may allow for the adaption of optical conversion module 100 to meet specific needs. For example, the number, size, and orientation of faceplate optical connectors 135 may be modified by replacing the faceplate 120 or specific faceplate optical connectors 135. Furthermore, different optical fiber jumpers 160 may be employed, thereby allowing the differing types of faceplate optical connectors 135 to retain connectivity with chip optical connector 155.

Optical conversion module 100 may further include other components to improve the operability of the device. In certain implementations, heat management devices, such as heatsinks 165 may be disposed on optical conversion module 100. The number and orientation of heatsinks 165 may vary based on the type of airflow within a computing system. Similarly, faceplate 120 may include various other heat management options (not shown), such as vents to allow air circulation over printed circuit board 105, as well as options to allow liquid cooling. Furthermore, optical conversion module 100 may also include additional integrated circuits disposed on the printed circuit board 105, such as signal conditioners, along with corresponding, heat sinks (not shown) that are independent from the heat sink 165.

Figure 2:
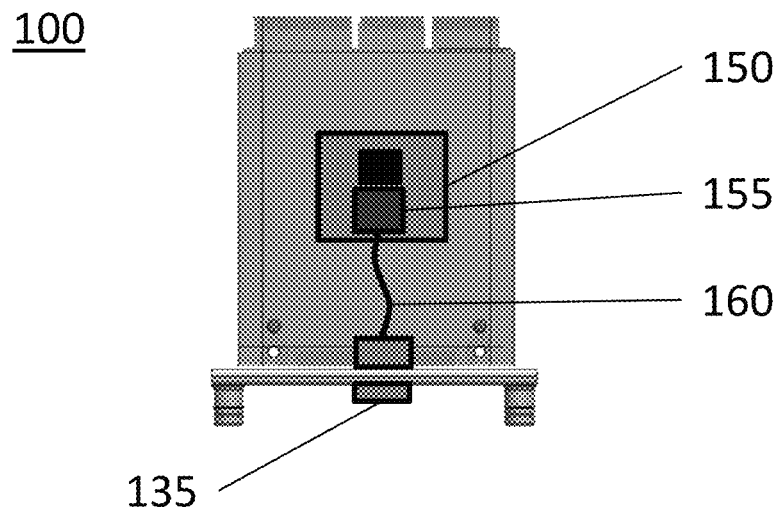
FIG. 2 is a top view of the optical conversion module of FIG. 1 in accordance with one or more example embodiments.

Referring to FIG. 2, a top view of the optical conversion module 100 of FIG. 1 according to an example embodiment is shown. For conciseness, FIG. 2 illustrates the optical conversion module 100 of FIG. 1 without heatsinks (165 of FIG. 1) and other components removed. As illustrated, optical conversion module 100 includes one optical transceiver 150, connected to one chip optical connector 155, which is connected to one optical fiber jumper 160, which is subsequently connected to one faceplate optical connector 135. In such an implementation, one connection is made from an external optical cable (not shown) and optical conversion module 100. Other orientations and configurations are discussed in FIGS. 3-5.

Figure 3:
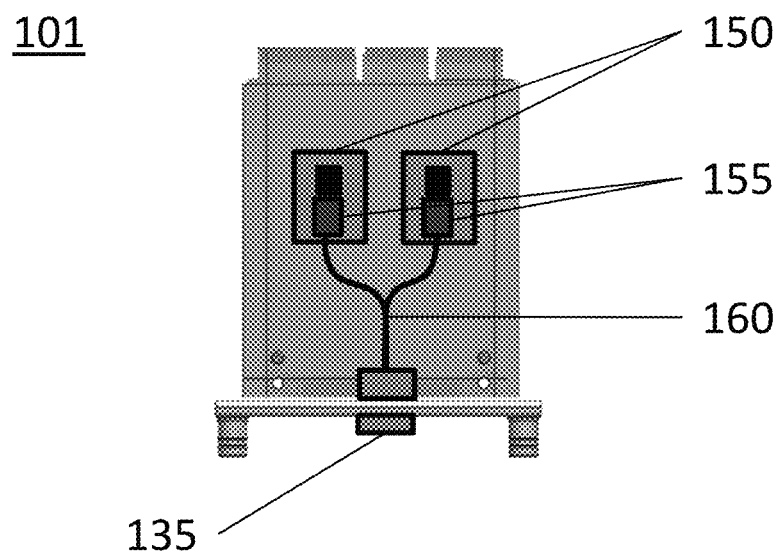
FIG. 3 is a top view of an optical conversion module in accordance with one or more example embodiments.

Referring to FIG. 3, a top view of an optical conversion module according to an example embodiment is shown. FIG. 3 provides an alternative optical conversion module 101 that includes two optical transceivers 150, each having a chip optical connector 155 disposed thereon. Both chip optical connectors 155 are connected to a faceplate optical connector 135 through an optical fiber jumper 160. In such an implementation, an optical signal received from an external source may be transferred through faceplate optical connector 135, split across different fibers within the optical fiber jumper 160, which then to multiple optical transceivers 150. Thus, the incoming signal may be split for transference or processing in multiple locations. In other implementations, more than two optical transceivers 150, each having chip optical connectors 155 may be used. For example, three, four, or more optical transceivers 150 and chip optical connectors 155 may be used, each tying into one optical fiber jumper 160 connected to one faceplate optical connector 135.

Figure 4:
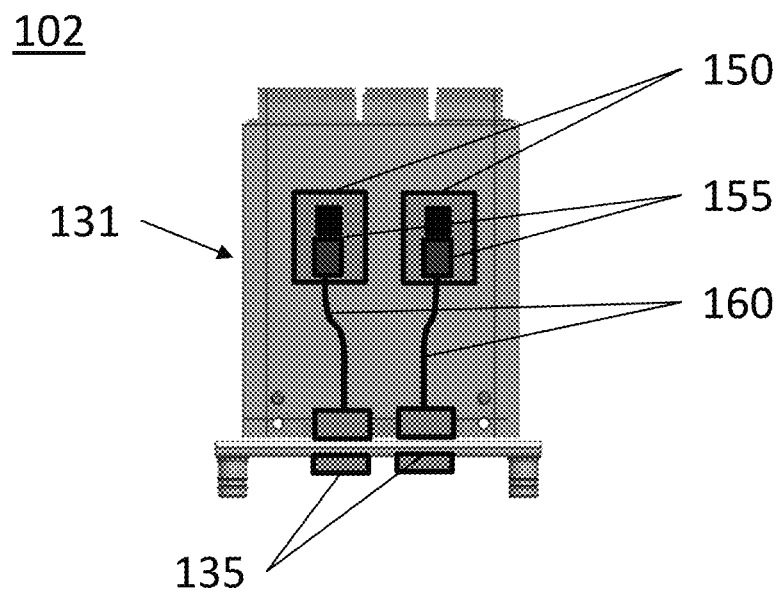
FIG. 4 is a top view of an optical conversion module in accordance with one or more example embodiments.

Referring to FIG. 4, a top view of an optical conversion module according to an example embodiment is shown. FIG. 4 provides an alternative optical conversion module 102 that includes two optical transceivers 150, each having a chip optical connector 155 disposed thereon. Each chip optical connector 155 is connected to a separate optical fiber jumper 160 that then connects to separate faceplate optical connectors 135. In such an implementation, signals from two sources may each be routed to independent optical transceivers 150 through independent optical fiber jumpers 160. In other implementations, more than two optical transceivers 150, each having chip optical connectors 155 may be used. For example, three, four, or more optical transceivers 150 and chip optical connectors 155 may be used, each tying into independent optical fiber jumpers 160 connected to independent faceplate optical connectors 135. Each optical fiber jumper 160 may contain multiple optical fibers wrapped in a protection sleeve jacket.

Figure 5:
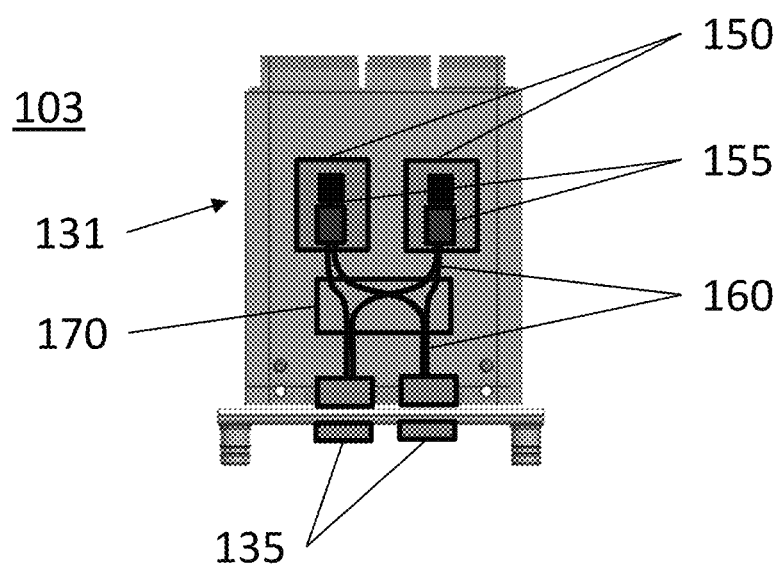
FIG. 5 is a top view of an optical conversion module in accordance with one or more example embodiments.

Referring to FIG. 5, a top view of an optical conversion module according to an example embodiment is shown. FIG. 5 provides an alternative optical conversion module 103 that includes two optical transceivers 150, each having a chip optical connector 155 disposed thereon. Each chip optical connector 155 is connected to a separate optical fiber jumper 160 that then connects to separate faceplate optical connectors 135. In this implementation, faceplate optical connectors 135 and optical transceivers 150 are connected through an optical shuffle 170. The optical shuffle 170 may contain multiple optical fibers from optical jumpers 160 that are cross-connected among the chip optical connectors 155 and the faceplate optical connectors 135. In such an implementation, signals may be routed through optical fibers from one or more faceplate optical connectors 135 and sent to one or more optical transceivers 150. In other implementations, more than two optical transceivers 150, each having chip optical connectors 155 may be used. For example, three, four, or more optical transceivers 150 and chip optical connectors 155 may be used, where optical fibers of the chip optical connectors 155 may be cross-connected to the faceplate optical connectors via the optical shuffle 170 and optical jumpers 160. The optical jumpers 160 may be wrapped within corresponding protection jackets.

Those of ordinary skill in the art having benefit of the present disclosure will appreciate that optical conversion modules 101, 102, and 103, of FIGS. 3, 4, and 5, may be modularly adapted to incorporate different faceplates 120 having differing numbers of optical connectors 135. As such, the same printed circuit assembly 131 may be used with a different faceplate 120. Examples of the adaptability of the optical connectors 135 through faceplate 120 adjustment is illustrated below in FIGS. 6-13, in addition to other sections throughout this disclosure.

Referring to FIGS. 6 and 7 together, a top view and end view, respectively, of the optical conversion modules of FIGS. 1 and 2 are shown. As explained above, optical conversion module 100 includes one optical transceiver 150, connected to one chip optical connector 155, which is connected to one optical fiber jumper 160, which is subsequently connected to one faceplate optical connector 135. In such an implementation, one connection is made from an external optical cable (not shown) and optical conversion module 100.

As specifically illustrated in FIG. 7, a single aggregated faceplate optical connector 135 is disposed through faceplate 120. An example of such a faceplate optical connector 135 includes a multi-fiber push on ("MPO"). Such a connection may be used to connect multi-fiber ribbon cables to optical conversion module 100, thereby allowing six pairs of fibers to be aggregated into a single connection for a 12-fiber MPO connector. Each pair of fiber may be referred to as a one-lane port. A port is formed from transmit and receive fibers, and a lane includes a fiber to transmit signals and another fiber to receive signals. For example, a multi-fiber ribbon cable having four, eight, twelve, sixteen, twenty-four, or more fibers may be connected to faceplate optical connector 135, thereby allowing transmission of multi-port data therebetween. Other types of optical cables may also be used, as well as other types of faceplate optical connectors 135, thereby allowing the optical conversion module 100 to be modularly adapted to fit the requirements for a specific computing system.

Referring to FIGS. 8 and 9 together, a top view and end view, respectively, of an optical conversion module according to an example embodiment is shown. Optical conversion module 104 includes, one optical transceiver 150, connected to one chip optical connector 155, which is connected to multiple optical fiber jumpers 160, which are subsequently connected to multiple faceplate optical connectors 135. In this implementation, bifurcatable faceplate optical connectors 135 are illustrated. For example, the chip optical connector 155 has 12 fibers and a pair of fibers is connected to each of the six faceplate connectors 135. When a two-fiber external optical cable (e.g., mini-duplex) is used on each of the six faceplate optical connectors 135, one lane worth of bandwidth is used for a port signal transmission. However, when a four-fiber external optical cable is used by straddling two of the size faceplate optical connectors 135, two lanes worth of bandwidth is used for a port signal transmission. Thus, six one-lane or three two-lane mini-duplex cables may be supported by the optical conversion module 104. FIG. 9 specifically illustrates two one-lane external optical cables 137 and two two-lane external optical cables 139, as an example.

Figure 10:
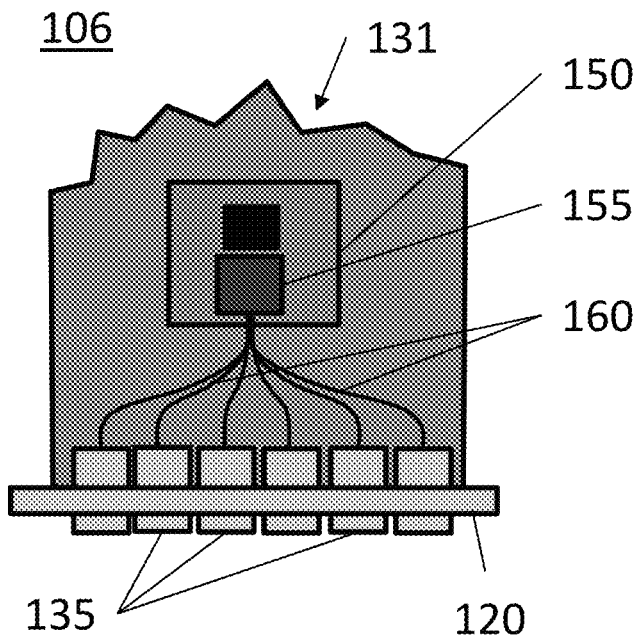
FIG. 10 is a top view of an optical conversion module in accordance with one or more example embodiments.
Figure 11:
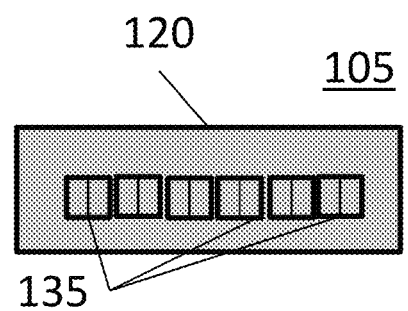
FIG. 11 is an end view of the optical conversion module of FIG. 10 in accordance with one or more example embodiments.

Referring to FIGS. 10 and 11 together, a top view and end view, respectively, of an optical conversion module according to an example embodiment is shown. Optical conversion module 106 includes one optical transceiver 150, connected to one chip optical connector 155, which is connected to multiple optical fiber jumpers 160, which are subsequently connected to multiple faceplate optical connectors 135. In this implementation, independent faceplate optical connectors 135 are illustrated. Such a connection may be used to connect six, two-fiber, mini-duplex connectors to corresponding faceplate optical connectors 135, thereby allowing signal transmission therethrough. In this implementation faceplate optical connectors 135 provide six independent one-lane ports.

Figure 12:
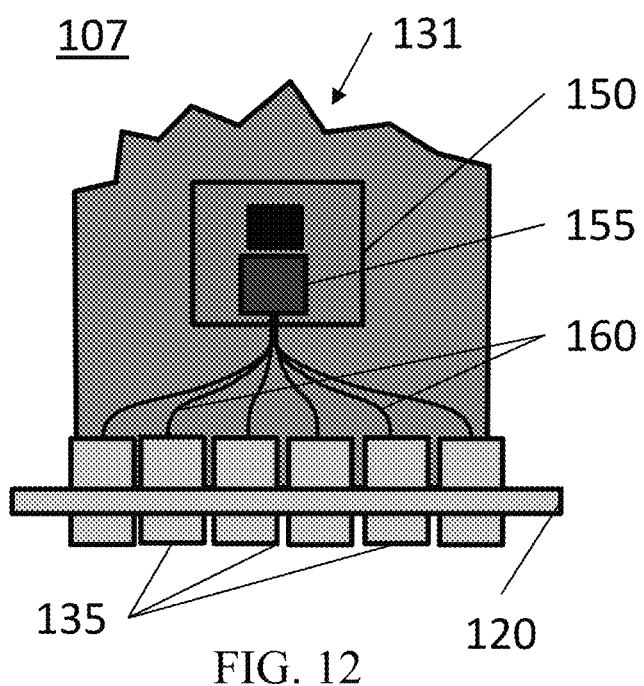
FIG. 12 is a top view of an optical conversion module in accordance with one or more example embodiments.
Figure 13:
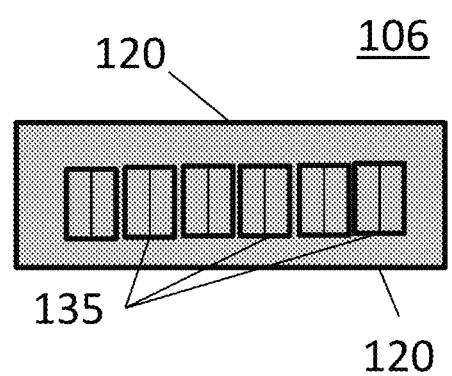
FIG. 13 is an end view of the optical conversion module of FIG. 12 in accordance with one or more example embodiments.

Referring to FIGS. 12 and 13 together, a top, view and end view, respectively, of an optical conversion module according to an example embodiment is shown. Optical conversion module 107 includes one optical transceiver 150, connected to one chip optical connector 155, which is connected to multiple optical fiber jumpers 160, which are subsequently connected to multiple faceplate optical connectors 135. In this implementation, independent faceplate optical connectors 135 are illustrated on a larger form factor faceplate 120. Such a connection may be used to connect six two-fiber, LC-duplex connectors to corresponding faceplate optical connectors 135, thereby allowing signal transmission therethrough. In this implementation faceplate optical connectors 135 provide six independent one-lane ports. Such an example may further provide for more or larger heatsinks (not shown) due to the larger form factor.

Those of ordinary skill in the art having benefit of the present disclosure will appreciate that optical conversion modules 100, 104 106, and 107, of FIGS. 6-13 may be modularly adapted to incorporate different faceplates 120 having differing numbers of optical connectors 135. As such, the same printed circuit assembly 131 may be used with a different faceplate 120. Thus, by modifying optical conversion modules 100, 104, 106, and 107 to replace faceplates 120 with faceplates 120 having a different number or type of optical connector 135, optical conversion modules 100, 104, 106, and 107 may be modularly adapter to fit the requirements of a particular computing operation.

Referring to FIG. 14, a top view of the optical conversion module of FIGS. 1, 2, 6, and 7 according to an example embodiment is shown. In this example, components discussed above with respect to FIGS. 1, 2, 6, and 7 are omitted for clarity in this Figure, as well as FIGS. 15-18. Optical conversion module 100 includes a heatsink 165, which is used to remove heat from components of optical conversion module 100. In such an example, faceplate 120 does not allow airflow in and out of optical conversion module 100. As such, air flows 175 in a pattern of recirculation within the computing system (not shown) in which optical conversion module 100 is installed. The air flow 175 pattern may vary according to the arrangement of components external to optical connecter module 100. For example, the number and orientation of fans within a computing system, as well as the location of individual components within the system may affect the air flow 175 patterns.

Referring to FIGS. 15 and 16 together, a top view and an end view, respectively, of an optical conversion module according to an example embodiment is shown. In this example, optical conversion module 108 includes a heatsink 165. Faceplate 120 includes air vents 180, which may allow air to flow in and out of a computing system (not shown) in which optical conversion module 108 is installed. In this implementation, faceplate 120 includes air vents 180 on both sides of faceplate optical connection 135, however, in other implementations, air vents 180 may be on one side of faceplate optical connection 135, and/or more or less air vents 180 may be present. Air flows 175 in a longitudinal direction across optical conversion module 108. As illustrated, the air flow 175 is directed over optical conversion module 108 and out of air vents 180. In other implementations, the air flow 175 pattern may provide air into computing system through air vents 180 or may be directed to flow into computing system through one side of air vents 180 and then directed out another side of air vents 180.

Figure 17:
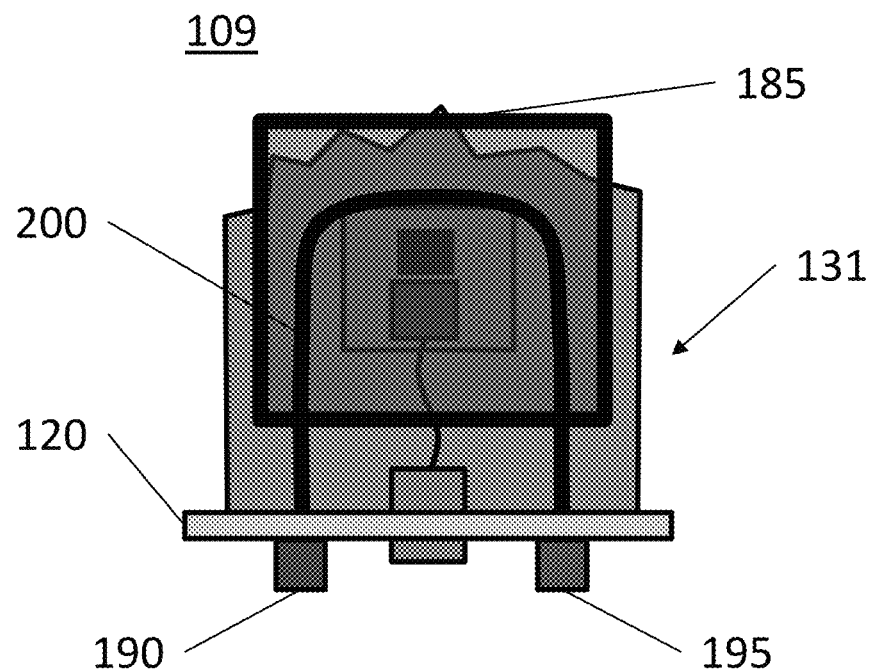
FIG. 17 is a top view of an optical conversion module in accordance with one or more example embodiments.
Figure 18:
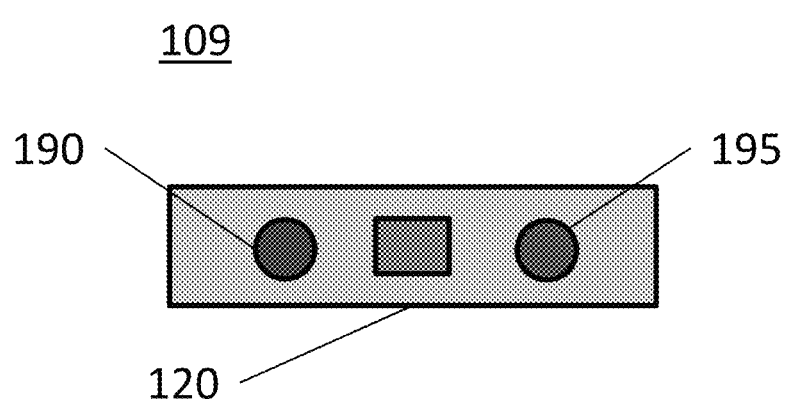
FIG. 18 is an end view of the optical conversion module of FIG. 17 in accordance with one or more example embodiments.

Referring to FIGS. 17 and 18 together, a top view and an end view, respectively, of an optical conversion module according to an example embodiment is shown. In this example, optical conversion module 109 includes a coldplate assembly 185. A liquid supply 190 and a liquid return 195 may be disposed through faceplate 120.

During operation, liquid may be flowed through liquid supply 190, along internal liquid path 200, and out liquid return 195. As the liquid flows through internal liquid path 200, heat may be transferred from optical conversion module 109 and air in a computing system (not shown) and absorbed by the liquid. As such, liquids cooler than the temperature inside computing system may be flowed through internal liquid path 200 in order to remove heat from optical conversion module 109 and/or other components of the computing system. In this example, optical conversion module 109 includes a single liquid supply 190 and a single liquid return 195, however, in other examples, more than one liquid supply 190 and liquid return 195 may be present. In other examples, either a liquid supply 190 or liquid return 195 may be disposed through faceplate 120, while the corresponding liquid supply 190 or liquid return 195 may be disposed at a different location within the computing system.

Those of ordinary skill in the art having benefit of the present disclosure will appreciate that optical conversion modules 100, 108, and 109 of FIGS. 14-18 may be modularly adapted to incorporate different faceplates 120 having different types of heat removal, or cooling features. As such, the same printed circuit assembly 131 along with heatsink 165 for optical conversion modules 100, 108 or coldplate assembly 185 for optical conversion module 109, may be used with a different faceplate 120. Thus, by modifying optical conversion modules 100, 108, and 109 to replace faceplates 120 with faceplates 120 having different heat removal features optical conversion modules 100, 108, and 109 may be modularly adapter to fit the requirements of a particular computing operation.

Figure 19:
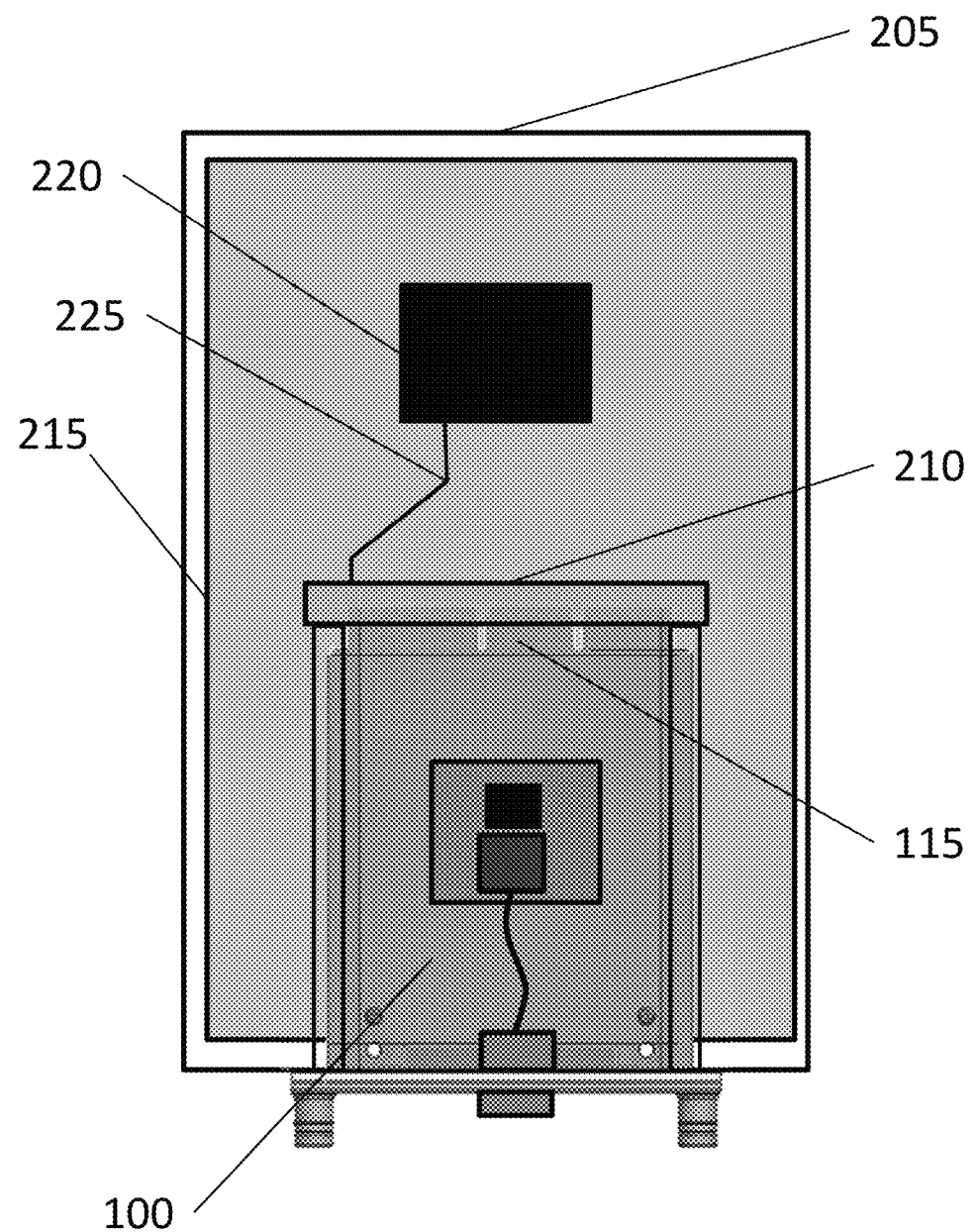
FIG. 19 is a top view of the optical conversion module of FIG. 1 installed in a computing system in accordance with one or more example embodiments.

Referring to FIG. 19, a top view of the optical conversion module of FIG. 1 installed in a computing system according to an example embodiment is shown. In this example, certain components discussed above with respect to FIG. 1 are omitted for clarity. Optical conversion module 100 is installed in a computing system 205. Computing system 205 includes a system electrical interface connection 210 that is disposed on a system board 215. As illustrated, electrical interface connection 210 is an edge contact connection, however, in other implementations, electrical interface connection 210 may include beam contact type connectors. The system electrical interface connection 210 is electrically connected to a system processor 220, or other component also disposed on system board 215, by one or more electrically conductive traces 225.

Optical conversion module 100 is installed in computing system 205 such that a module electrical interface 115 connects to the corresponding system electrical interface connection 210, thereby allowing communication between the optical conversion module 100 and computing system 205. During operation, a signal may be sent to or from an external source (not shown) through an external optical cable (not shown) through optical conversion module 100 and to computing system 205 for processing or other required operations. As illustrated, the length of the electrically conductive trace 225 is relatively short, as the optical conversion module 100 extends longitudinally into computing system 205. As such, signal loss along the electrically conductive trace 225 may be minimized, thereby increasing the available transmittance speeds.

Figure 20:
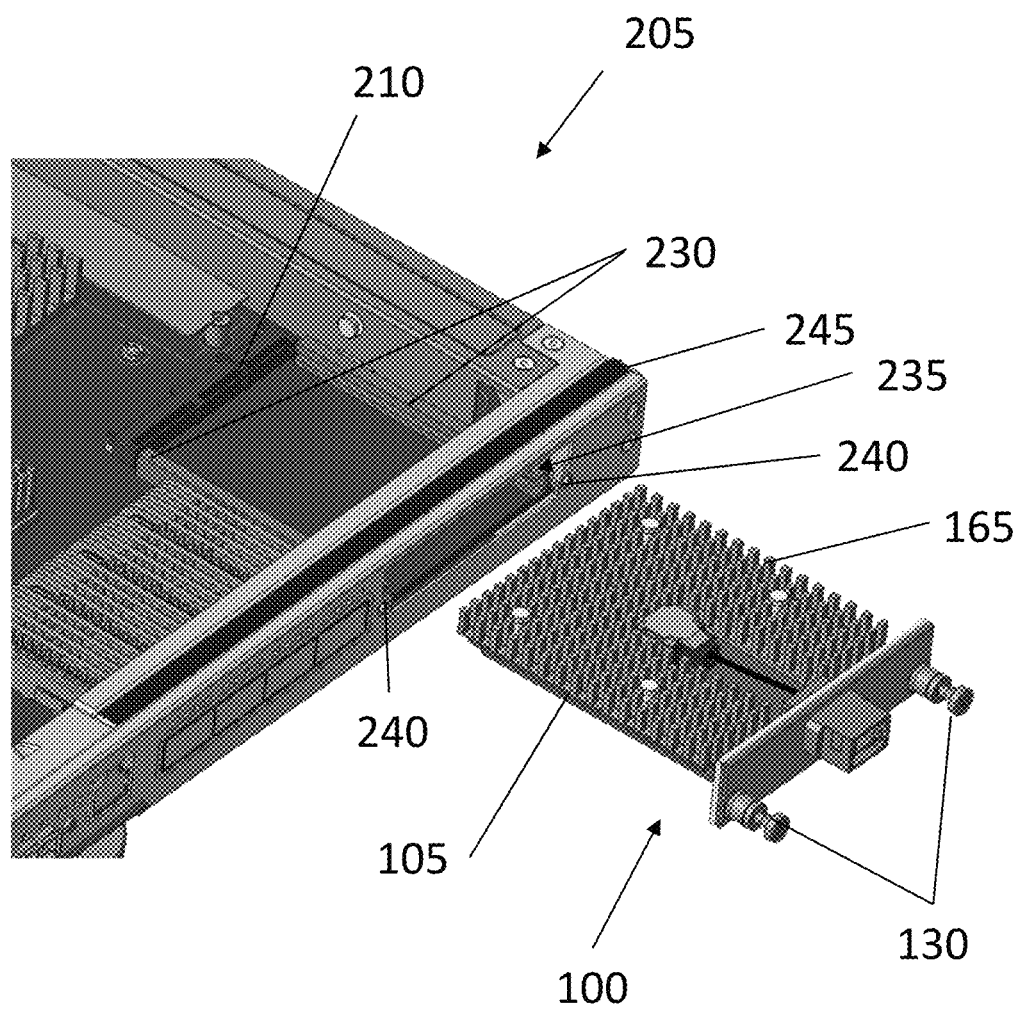
FIG. 20 is an elevated perspective view of an optical conversion module removed from a computing system in accordance with one or more example embodiments.

Referring to FIG. 20, an elevated perspective view of an optical conversion module removed from a computing system according to an example embodiment is shown. In this example, certain components discussed above with respect to prior figures are omitted for clarity. As illustrated, an optical conversion module 100 is shown prior to installation into a computing system 205. During installation, optical conversion module 100 may slide into computing system 205, such that the printed circuit board 105 slides along guide rails 230 inside module aperture 235 of computing system 205. The guide rails 230 lead optical conversion module 100 into contact with system electrical interface connection 210, thereby allowing the module electrical interface (not visible) to connect with the system electrical interface connection 210. The module electrical interface may be pressed into connection with system electrical interface connection 210, thereby securing optical conversion module in place 100.

To further secure optical conversion module 100 through faceplate 120 to computing system 205, one or more retention devices 130 may be coupled or otherwise removably connected to corresponding retention devices 240 of a chassis 245 of computing system 205. In one example, the retention devices 130 may include screws, and the corresponding retention devices 240 may include receiving apertures, such as threaded holes.

The relatively low profile of optical conversion module 100 also allows a heatsink 165 to be disposed over a relatively large area of printed circuit board 105. The heatsink 165 is fully exposed to the cooling environment of the system 205. As such, heat generated by components of optical conversion module 100 may be directly removed from optical conversion module 100.

Figure 21:
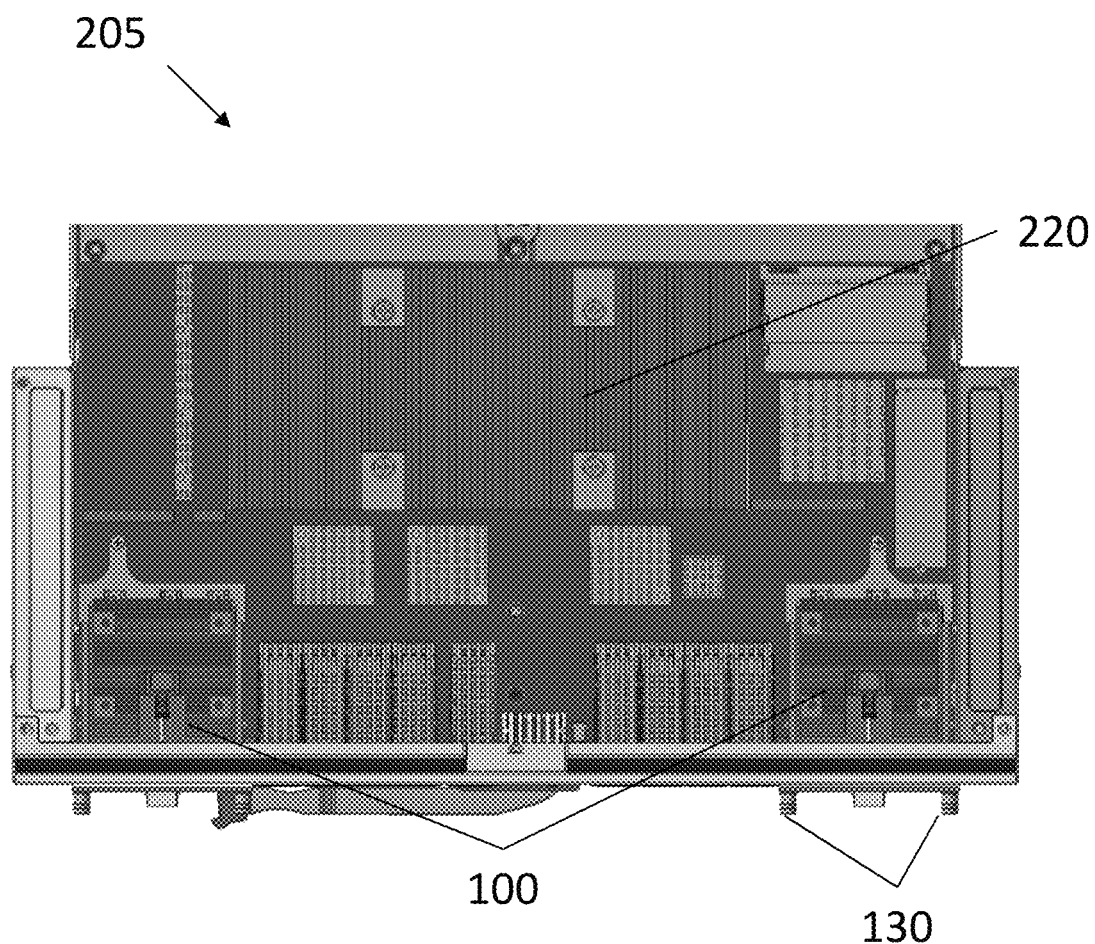
FIG. 21 is a top view of a computing system having two optical conversion modules in accordance with one or more example embodiments.
Figure 22:
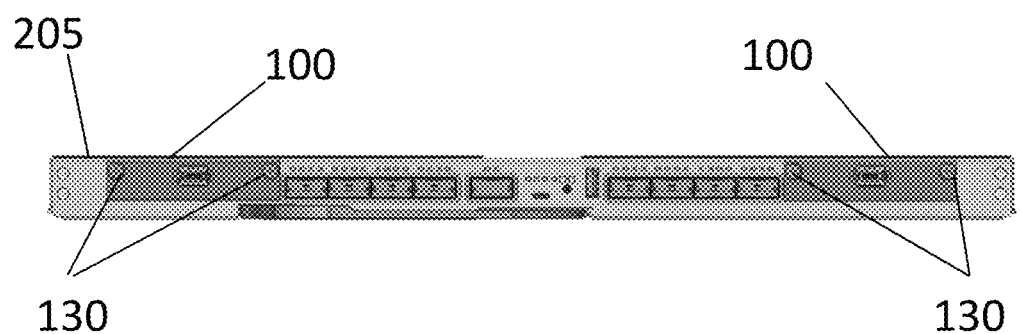
FIG. 22 is an end view of the computing system of FIG. 22 in accordance with one or more example embodiments.

Referring to FIGS. 21 and 22 together, a top view and an end view, respectively, of a computing system having two optical conversion modules according to an example embodiment is shown. In this example, certain components discussed above with respect to prior figures are omitted for clarity. In this example, a computing system 205 is illustrated having two optical conversion modules 100 installed therein. Optical conversion modules 100 are installed on opposing sides of computing system 205, however, in other example, optical conversion modules 100 may be installed next to one another, or in various other orientations depending on the internal layout of computing system 205. Optical conversion modules 100 are secured in place using retention devices 130. In this example, optical conversion modules 100 each have two retention devices 130, however, in other embodiments, more or less than two retention devices 130 may be used.

Figure 23:
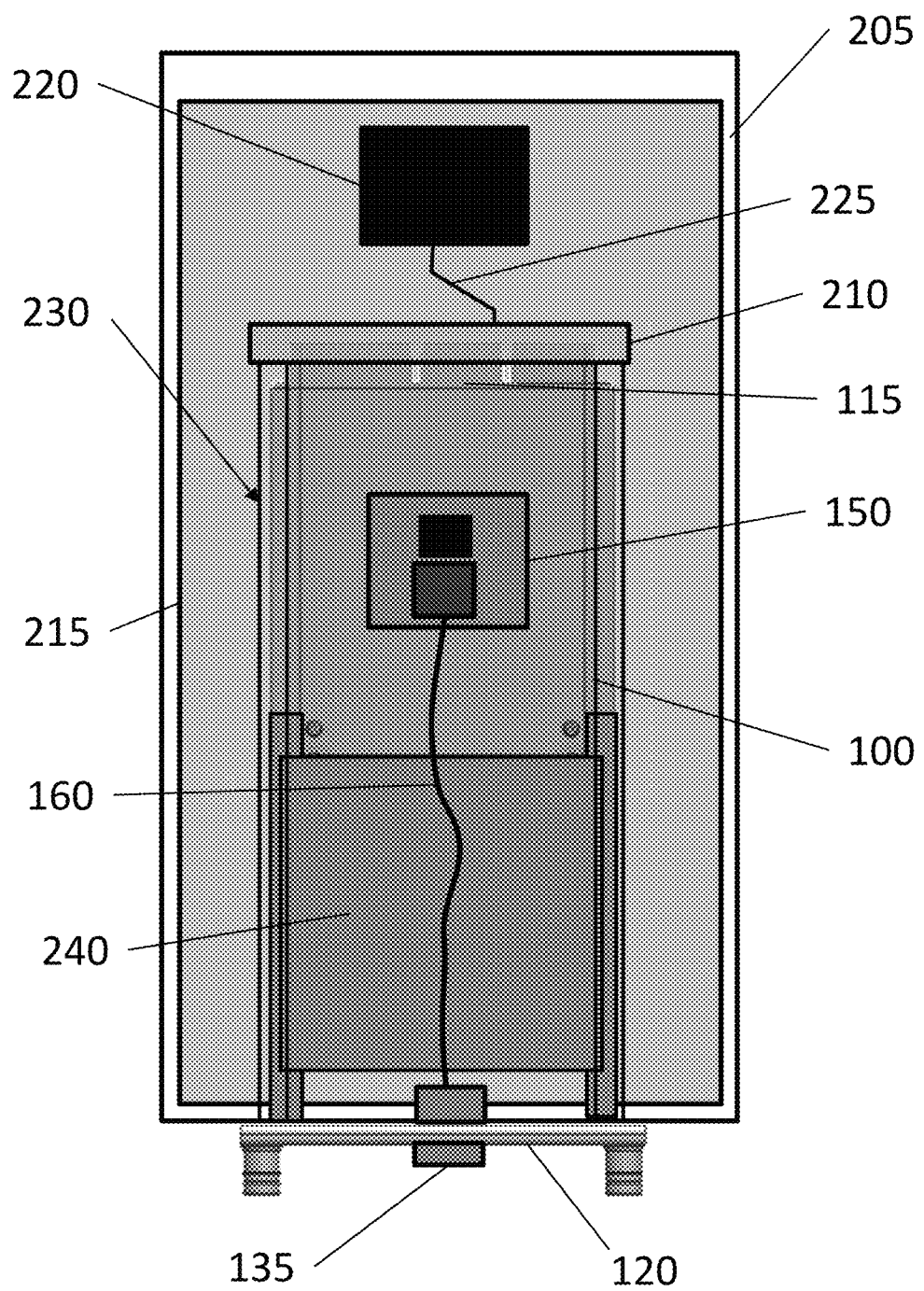
FIG. 23 is a top view of an optical conversion module on an extended carrier bracket in accordance with one or more example embodiments.

Referring to FIG. 23, a top view of an optical conversion module on an extended carrier bracket according to an example embodiment is shown. In this example, certain components discussed above with respect to prior figures are omitted for clarity. This example shows an optical conversion module 100 installed in a computing system 205. Computing system 205 has a system electrical interface connection 210 a system processor 220, and an electrically conductive trace 225 disposed on a system board 215. Computing system 205 further has a pair of guide rails 230 configured to guide optical conversion module 100 to allow the module electrical interface 115 to be in connection with the system electrical interface connection 210.

In this example, the optical conversion module 100 further includes an extended carrier bracket 240 that extends the optical conversion module 100 longitudinally. Because the extended carrier bracket 240 extends optical conversion module 100, a relatively longer optical fiber jumper 160 is used to connect optical transceiver 150 to faceplate optical connector 135. Extended carrier bracket 240 may be formed from any material capable of holding and extending optical conversion module 100, thereby allowing optical conversion module 100 to connect to system electrical interface connection 210 at a location longitudinally deep inside computing system 205. Because optical connection module 100 connects to system electrical interface connection 210 relatively close to system processor 220, the length of electrically conductive traces 225 are shorter. As such, signal loss along electrically conductive traces 225 may decrease, thereby allowing faster transfer rates with lower signal loss.

As described above, optical conversion module 100 may be modularly adapted to meet changing requirements in a computing environment. For example, optical conversion module 100 may be modified by replacing faceplate 120 with a different faceplate 120 having a different number of optical connectors 135. Examples of such optical connectors 135 that may be replaced through faceplate 120 replacement/modification are illustrated and described above with respect to FIGS. 6-13. Additionally, optical conversion module 100 may be modified by changing faceplates 120 having other differences, such as the heat removal features illustrated and explained above with respect to FIGS. 14-18. As such, other components of optical conversion module 100 may remain the same while aspects of faceplate 120 are modularly adapted to meet changing requirements of particular computing operations.

Figure 24:
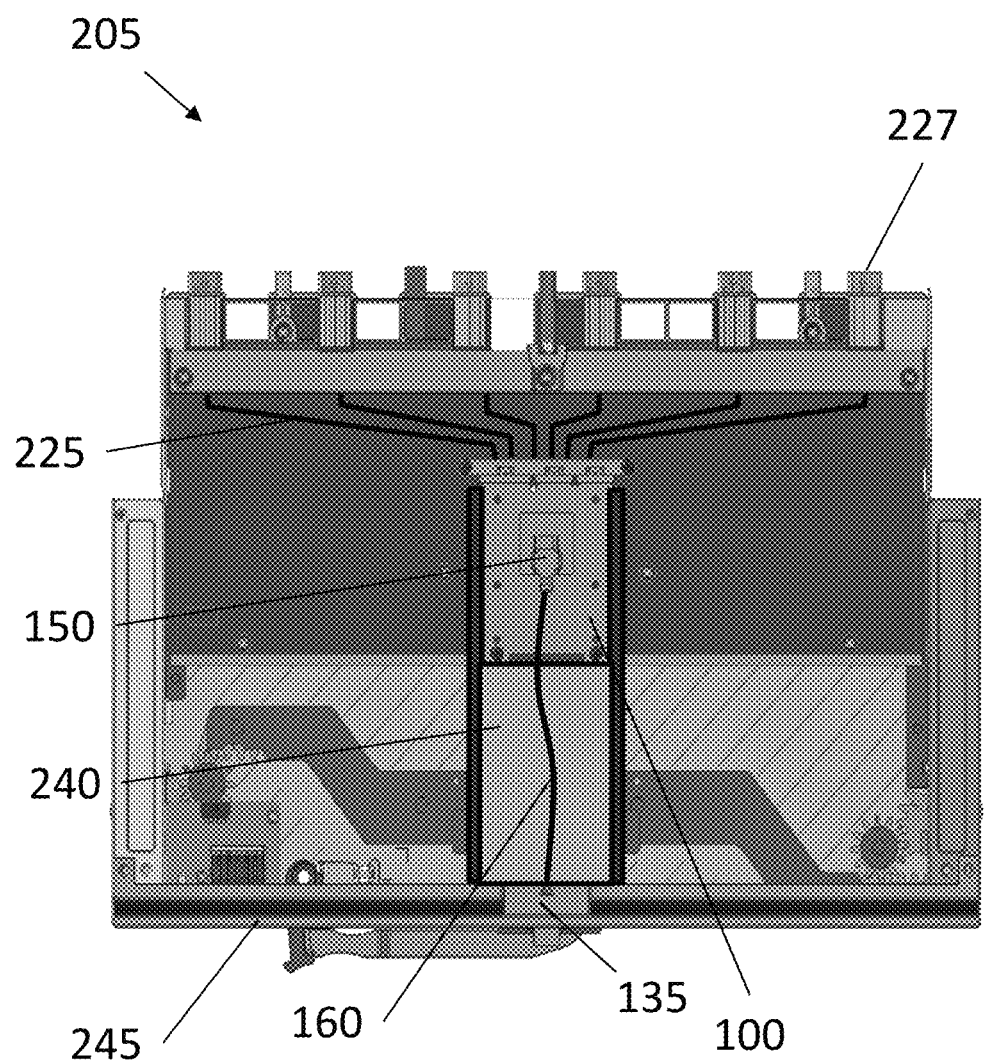
FIG. 24 is a top view of a computing system having an optical conversion module on an extended carrier bracket in accordance with one or more example embodiments.
Figure 25:
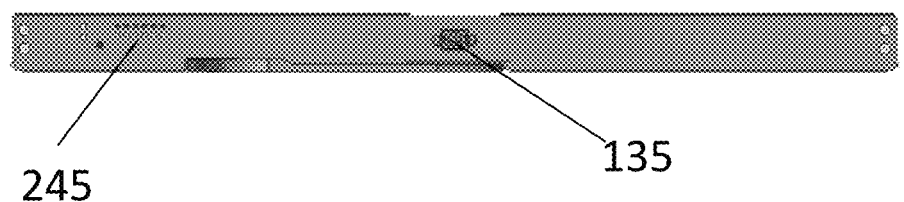
FIG. 25 is an end view of the computing system of FIG. 25 in accordance with one or more example embodiments.

Referring to FIGS. 24 and 25 together, a top view and an end view, respectively, of an optical conversion module on an extended carrier bracket according to an example embodiment is shown. In this example, certain components discussed above with respect to prior figures are omitted for clarity. Optical conversion module 100 is illustrated installed in computer system 205 on an extended carrier bracket 240. As such, the electrical connection between optical conversion module 100 and computer system 205 occurs deeper within chassis 245. Because of the connection depth, electrically conductive traces 225 are relatively short, thereby reducing signal loss during data transmittance. FIG. 25 specifically shows that the faceplate optical connector 135 is the same as with implementations not including an extended carrier bracket 240. However, optical fiber jumper 160 is extended to facilitate that connection between faceplate optical connector 135 and optical transceiver 150.

FIG. 24 also illustrates computing system 205 having midplane connectors 227. The midplane connectors 227 may be used to connect optical conversion modules 100, or other networking, input/output, and peripheral devices (not shown) to a processing portion (not shown) of computing system 205 within the same enclosure (not shown). An example of a processing portion may be a blade server in a blade system enclosure. By decreasing the length of the electrically conductive traces 225 in computing system 205 and in processing portion (not shown), both before and after midplane connectors 227, total signal loss may be lessened, thereby allowing faster transmission speeds therethrough.

Figure 26:
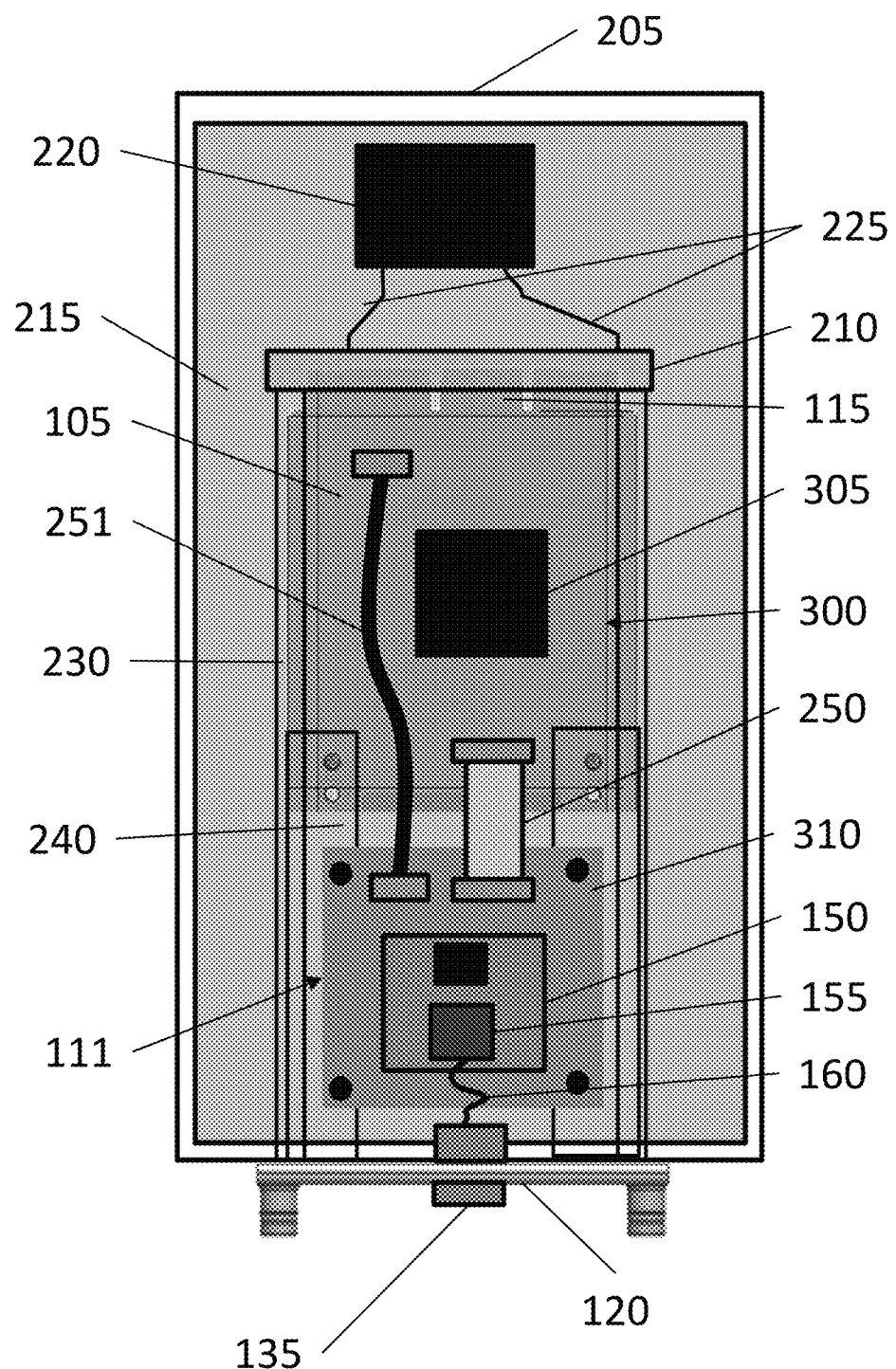
FIG. 26 is a top view of an optical conversion module on an extended carrier bracket having multiple components in accordance with one or more example embodiments.

Referring to FIG. 26, a top view of an optical conversion module on an extended carrier bracket having multiple components according to an example embodiment is shown. In the computing system 205 illustrated, an optical conversion module 111 is disposed on an extended carrier bracket 240. In addition to optical conversion module 111, a first device 300 is also disposed on extended carrier bracket 240.

In this implementation, first device 300 includes a first printed circuit board 105 having a module electrical interface 115. First device 300, in certain examples, may include a module processor 305, or other components for processing or transmitting data. For example, module processor 305 may also include network interface controllers, security processors, acceleration processors, or other components not specifically described herein. Module electrical interface 115 of first device 300 is electrically connected to a system electrical interface connection 210 of a system board 215 of computing system 205.

Optical conversion module 111 may be disposed on a second printed circuit board 310. An optical transceiver 150 may be disposed on second printed circuit board 310 and a chip optical connector 155 may be connected to optical transceiver 150. Chip optical connector 155 may be optically connected to optical fiber jumper 160, which may be connected to a faceplate optical connector 135. The transmission of data from faceplate optical connector 135, through optical fiber jumper 160 to optical transceiver 150 may function as described above with respect to FIG. 1.

In this implementation, first printed circuit board 105 and second printed circuit board 310 may be connected through one or more power/management electric cables 251. The power/management electrical cables 251 may be used to transmit data and/or provide power between first printed circuit board 105 and second printed circuit board 310. First printed circuit board 105 and second printed circuit board 310 may further be connected though one or more signal cables 250. Signal cables 250 may be either electrical or optical. In an implementation where signal cables 250 are optical, optical to electrical conversation may occur before the transmitted signals interface with optical transceiver 150, where optical transceiver 150 may perform wavelength conversion, for example. After data is received by optical transceiver 150 on the second printed circuit board 310 from the faceplate optical connector 135, the data may be sent to the module processor 305 on the first printed circuit board 105, where the data may be further processed, or the data may be sent to system board 215 for further computing by the system processor 220. In other implementations, first printed circuit board 105 and second printed circuit board 310 may be electrically connected directly, thereby eliminating the need for electric cables 250, 251.

As illustrated, both first printed circuit board 105 and second printed circuit board 310 are disposed on extended carrier bracket 240. Extended carrier bracket 240 may then be disposed on guide rails 230 within computing system 205. Because the guide rails 240 extended relatively deeply into computing system 205, electrically conductive traces 225 connecting system electrical interface connection 210 to a system processor 220 disposed on the system board 215 may be relatively short. The relatively short electrically conductive traces 225 may thereby decrease signal loss, allowing for higher transfer speed applications.

Figure 27:
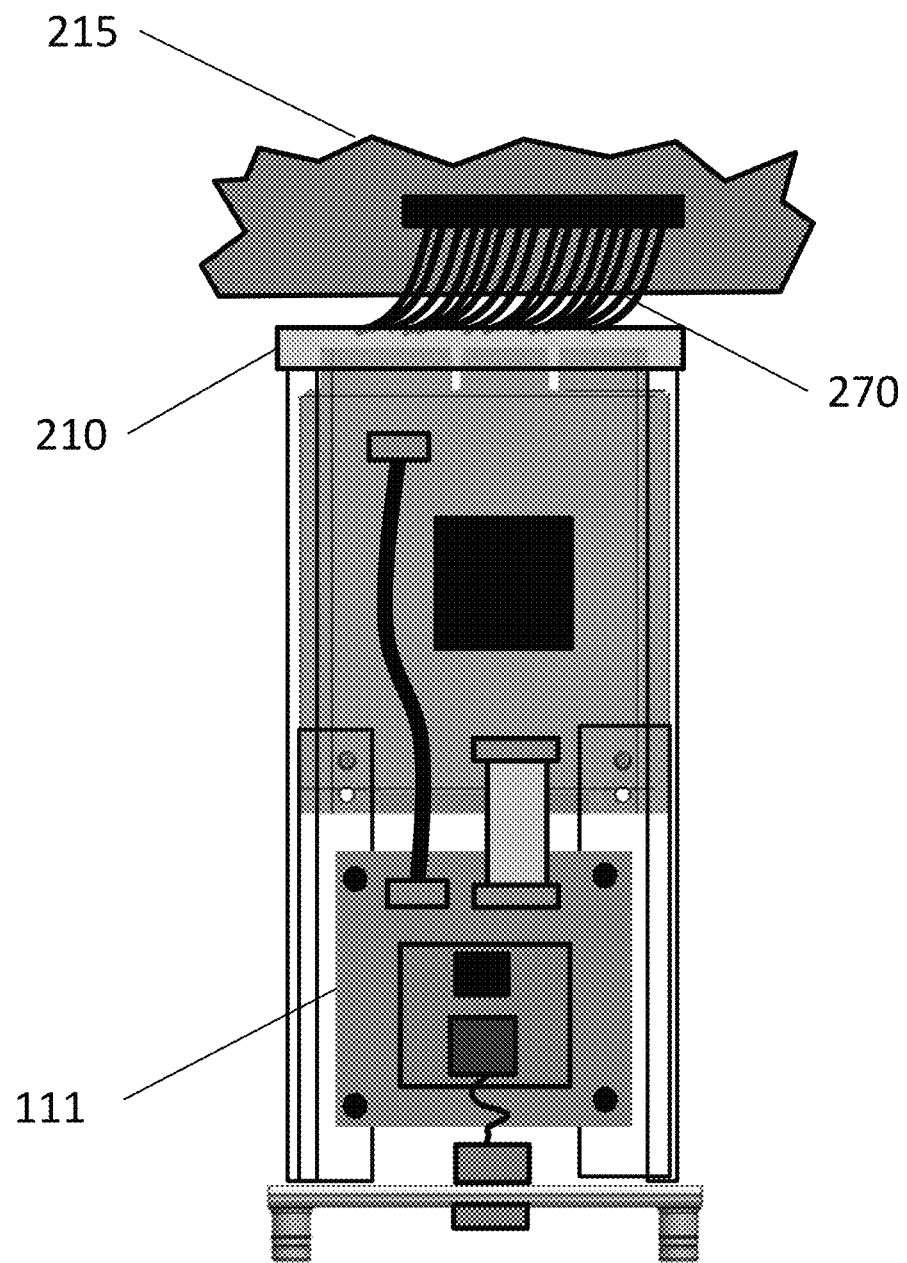
FIG. 27 is a top view of an optical conversion module on an extended carrier bracket having multiple components in accordance with one or more example embodiments.

Referring to FIG. 27, a top view of the optical conversion module of FIG. 26 is shown according to an example embodiment. In this example, optical conversion module 111 is the same as described with respect to FIG. 26. However, in this example, the system electrical interface connection 210 is attached to the system board 215 through system electrical fly-over cables 270. As such, the connection between the system electrical interface connection 210 and the system processor (not shown) or other device occurs with shorter electrically conductive trace (not shown) runs. As such, signal loss may be further decreased, thereby allowing higher transmittance speeds.

Implementations of the present disclosure may further include methods of modifying an optical conversion module. Because of the modularity of various components of the optical conversion module, the optical conversion module may be adapted to fit the changing requirements of a computing system, set of servers, set of switches, or use, for example, within a data center. Changes to cable connections, cables, hardware, and the like may require adaptation of computing system components. The adaptability of the present optical conversion module may thereby allow for incremental changes rather than replacement of larger system components.

With respect to FIGS. 26 and 27, as described above, optical conversion module 111 may be modularly adapted to meet changing requirements in a computing environment. For example, optical conversion module 111 may be modified by replacing faceplate 120 with a different faceplate 120 having a different number of optical connectors 135. Examples of such optical connectors 135 that may be replaced through faceplate 120 replacement/modification are illustrated and described above with respect to FIGS. 6-13. Additionally, optical conversion module 100 may be modified by changing faceplates 120 having other differences, such as the heat removal features illustrated and explained above with respect to FIGS. 14-18. As such, other components of optical conversion module 111 and or first device 300 may remain the same while aspects of faceplate 120 are modularly adapted to meet changing requirements of particular computing operations.

Similarly, second printed circuit board 310 may be modified to include additional optical transceivers 150, additional chip optical connectors 155, or changes to optical fiber jumper 160. Such modifications may occur while retaining original faceplate 120 or otherwise adapting faceplate 120 to the other modifications. Examples of such changes that may occur to second printed circuit board 310, and components disposed thereon, are described in detail above with respect to FIGS. 2-5.

Figure 28:
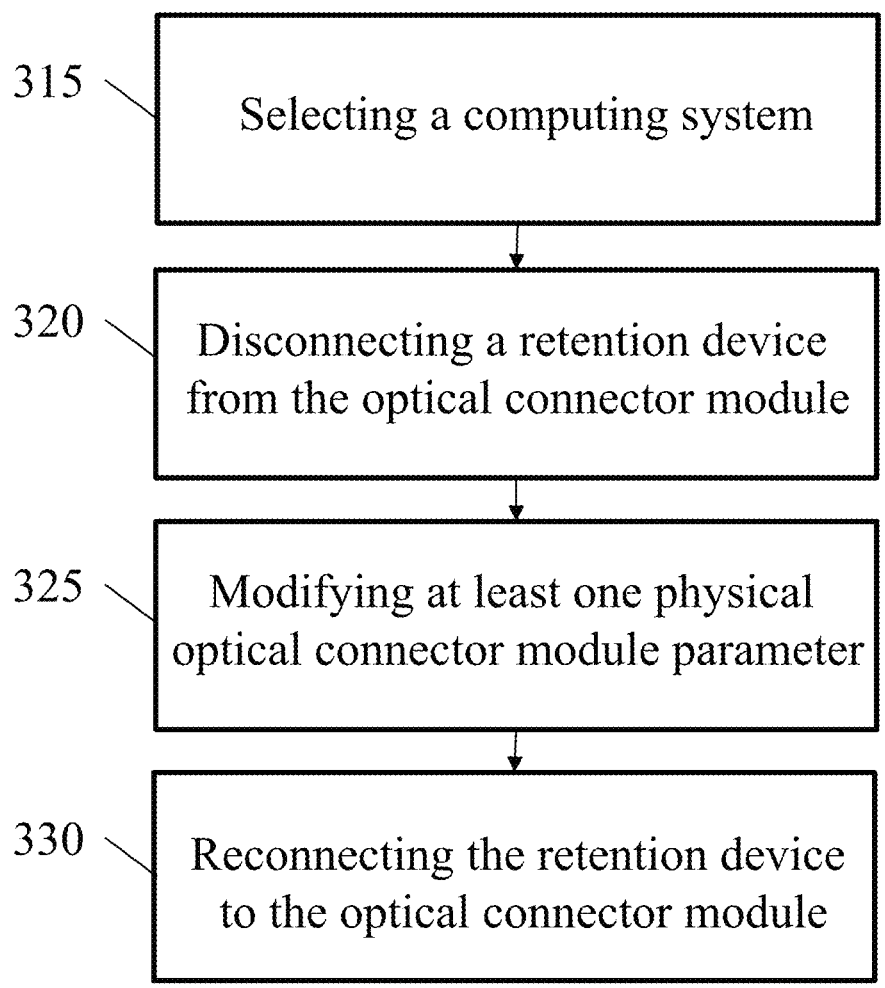
FIG. 28 is a block diagram of a method of modifying an optical conversion module in accordance with one or more example embodiments.

Referring to FIG. 28, methods of modifying an optical connector may initially include selecting (315) a computing system having a chassis, wherein the chassis has an optical port aperture and a system board disposed within the chassis. The system board may have an electrical interface connection disposed on or connected to the system board. An optical conversion module may be disposed in the optical port aperture, such as on guide rails and/or on an extended carrier bracket, as discussed above. The optical conversion module may have a modular faceplate, a faceplate optical connection, a retention device, and an electrical interface. The electrical interface may be connected to the electrical interface connection through various implementations, as discussed above.

After a computing system having an optical conversion module is selected (315), based on, for example, a requirement for adaption to meet changed computing requirements, the retention device may be disconnected (320) from the optical conversion module. Disconnection (320) may include, for example, unscrewing one or more screws, releasing a latch, or otherwise physically disconnecting (320) the retention device from the faceplate. After disconnection (320) of the faceplate, various physical features of the optical conversion module may be modified (325).

Modification (325) of the physical features of the optical conversion module refers to changing at least one physical component, orientation, or implementation of the optical conversion module, and, is referred to herein as modification (325) of at least one physical optical conversion module parameter. Examples of such parameters may include changing the faceplate, the number of optical connectors, the orientation of the optical connectors, the type of optical connectors, the number or orientation of the optical fiber jumpers, the number of optical transceivers, the number of chip optical connectors, addition of components, such as an extended carrier bracket, adding electric cables, removing electric cables, changing an electrical interface, a heat mitigation aspect, and modification (325) of any other physical aspect of optical conversion module.

By way of example, several such physical modifications (325) are discussed in further detail. In one implementation, the modifying (325) at least one physical optical conversion module parameter may include removing the modular faceplate, disconnecting an optical jumper cable from the faceplate optical connector, and reconnecting the optical jumper cable to a second faceplate optical connecter having a different number of optical connectors. This modification may thereby allow the optical conversion module to be adapted to accept a different type of optical connection. Exemplary connection types were previously discussed with respect to FIGS. 6-13, however, other types of connectors may also be used.

In another implementation, the modifying (325) at least one physical optical conversion module parameter may include removing the modular faceplate, disconnecting an optical jumper cable from the faceplate optical connector, and reconnecting the optical jumper cable to a second faceplate optical connecter having air vents. Air vents may be added in order to facilitate or otherwise change the air flow dynamics over the optical conversion module and/or a computing system.

In another implementation, the modifying (325) at least one physical optical conversion module parameter may include removing the modular faceplate, disconnecting an optical jumper cable from the faceplate optical connector, and reconnecting the optical jumper cable to a second faceplate optical connecter having a liquid supply and a liquid return. Such an implementation may further facilitate heat removal from a computing system.

In still another implementation, the modifying (325) at least one physical optical conversion module parameter may include removing the modular faceplate, disconnecting an optical jumper cable from the faceplate optical connector, and disposing the optical conversion module on an extended carrier bracket. As explained above, this may allow an electrical interface connection to be disposed closer to a processor, thereby allowing higher speed connections to be used.

In still another implementation, the modifying (325) at least one physical optical conversion module parameter may include at least one of removing, replacing, and modifying the optical conversion module while the computing system is operating. This is referred to as providing a hot-swappable connection, thereby allowing replacement, removal, or modification of the optical conversion module while not preventing interruption to other components of the computing system.

After modification (325), the retention device may be reconnected (330) to the optical conversion module. The reconnecting (330) may include, for example, screwing the retention device back onto the faceplate, thereby securing the faceplate in place.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, apparatuses, systems, and methods disclosed herein may be used to allow for the modular exchange of components on an optical conversion module.

In one or more examples, apparatuses, systems, and methods disclosed herein may be used to decrease the costs associated with computing system updates.

In one or more examples, apparatuses, systems, and methods disclosed herein may be used to adapt an optical connector to new or different optical connections without replacing entire computing system components.

In one or more examples, apparatuses, systems, and methods disclosed herein may be used to decrease electrically conductive trace lengths between electrical interface connections with optical connectors and system processors on a system board of a computing system. Shorter electrically conductive traces may thereby decrease signal loss, allowing for higher speed transmission of data.

In one or more examples, apparatuses, systems, and methods disclosed herein may be used to increase transmission speeds of data through optical connections.

In one or more examples, apparatuses, systems, and methods disclosed herein may be used to improve the heat dissipation aspects of optical connections and computing systems without replacing entire computing system components.

In one or more examples, apparatuses, systems, and methods disclosed herein may be used to increase the number of optical transceivers located on optical connector components.

In one or more examples, apparatuses, systems, and methods disclosed herein may be used to extend the longitudinal depth of optical connectors within computing systems, thereby decreasing the length of electrically conductive traces.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope of claims below as illustrated by the example embodiments disclosed herein. Accordingly, the scope of the protection sought should be limited only by the appended claims.

What is claimed is:

1. An optical conversion module comprising:
a printed circuit board having a proximate end and a distal end, and including an electrical interface at the distal end;
a faceplate modularly connected to the proximate end of the printed circuit board, the faceplate having at least one retention device;
an optical transceiver disposed on and electrically connected to the printed circuit board;
a chip optical connector disposed on and optically connected to the optical transceiver;
a faceplate optical connector modularly disposed through the faceplate and modularly connected to the chip optical connecter through an optical fiber jumper; and
a module processor disposed directly on the printed circuit board to manipulate data received through the faceplate optical connector.

2. The optical conversion module of claim 1, further comprising a second faceplate optical connector connected to the optical fiber jumper.

3. The optical conversion module of claim 1, further comprising a second optical transceiver disposed on and electrically connected to the printed circuit board, a second chip optical connector disposed on and connected to the optical transceiver, and a second optical fiber jumper connecting the second chip optical connector to a second faceplate optical connector.

4. The optical conversion module of claim 3, further comprising a cross-connection optical fiber jumper connecting the optical transceiver to the second faceplate optical connector.

5. The optical conversion module of claim 1, further comprising an extended carrier bracket disposed below the printed circuit board.

6. The optical conversion module of claim 1, further comprising a coldplate assembly including a liquid supply and a liquid return disposed through the faceplate.

7. A computing system, the system comprising:
a computing platform comprising:
a chassis having a module aperture; and
a system board disposed in the chassis, the system board having a system electrical interface connection and a pair of guide rails; and
an optical conversion module having a proximate end and a distal end and comprising:
a first printed circuit board disposed on an extended carrier bracket longitudinally extending within the chassis, the first printed circuit board having a module electrical interface connected to the system electrical interface connection;
a faceplate modularly connected to the proximate end of the optical conversion module, the faceplate having at least one faceplate retention device;
an optical transceiver;
a chip optical connector disposed on and connected to the optical transceiver; and
a faceplate optical connector modularly disposed through the faceplate and modularly connected to the chip optical connecter through an optical fiber jumper.

8. The computing system of claim 7, wherein the optical transceiver is disposed on a second printed circuit board.

9. The computing system of claim 8, wherein the second printed circuit board is disposed on the extended carrier bracket.

10. The computing system of claim 8, further comprising an electrical cable electrically connecting the first printed circuit board to the second printed circuit board.

11. The computing system of claim 8, wherein the first printed circuit board and the second printed circuit board are directly connected.

12. The computing system of claim 7, wherein the optical conversion module is disposed on an extended carrier bracket disposed on the guide rails.

13. The computing system of claim 7, further comprising an electrical fly-over cable electrically connecting the system electrical interface connection to the system board.

14. The computing system of claim 7, further comprising a module processor disposed on the printed circuit board.

* * * * *